(12) United States Patent
Catton

(10) Patent No.: US 9,892,551 B2
(45) Date of Patent: Feb. 13, 2018

(54) AVIONICS DISPLAY SYSTEM

(71) Applicant: GE Aviation Systems Limited, Cheltenham, Gloucestershire (GB)

(72) Inventor: Lewis William Catton, Cheltenham (GB)

(73) Assignee: GE AVIATION SYSTEMS LIMITED (GB)

( * ) Notice: Subject to any disclaimer, the term of this patent is extended or adjusted under 35 U.S.C. 154(b) by 0 days.

(21) Appl. No.: 15/085,351

(22) Filed: Mar. 30, 2016

(65) Prior Publication Data

US 2016/0292914 A1 Oct. 6, 2016

(30) Foreign Application Priority Data

Apr. 2, 2015 (GB) .................................. 1505780.5

(51) Int. Cl.
| | | |
|---|---|---|
| G06T 15/50 | (2011.01) | |
| G06T 15/80 | (2011.01) | |
| G06T 1/20 | (2006.01) | |
| G06T 1/60 | (2006.01) | |

(52) U.S. Cl.
CPC ............... *G06T 15/80* (2013.01); *G06T 1/20* (2013.01); *G06T 1/60* (2013.01)

(58) Field of Classification Search
None
See application file for complete search history.

(56) References Cited

U.S. PATENT DOCUMENTS

| | | | |
|---|---|---|---|
| 6,972,769 B1 * | 12/2005 | Nebeker | ............... G06T 15/005 345/552 |
| 7,671,862 B1 | 3/2010 | Patel et al. | |
| 8,933,934 B1 | 1/2015 | Hill et al. | |

(Continued)

FOREIGN PATENT DOCUMENTS

| | | |
|---|---|---|
| JP | H7-121730 A | 5/1995 |
| JP | H11-219450 A | 8/1999 |

(Continued)

OTHER PUBLICATIONS

Great Britain Search Report and Written Opinion dated Sep. 28, 2015 which was issued in connection with Great Britain Patent Application No. 1505780.5 which was filed on Apr. 2, 2015.

(Continued)

*Primary Examiner* — Martin Mushambo
(74) *Attorney, Agent, or Firm* — GE Global Patent Operation; William S Munnerlyn (57) ABSTRACT

The avionics display system is for displaying a scene in an aircraft cockpit. The avionics display system includes a central processing unit CPU, a graphics processing unit GPU operably coupled to the CPU, and a display. The GPU comprises at least one vertex shader, and the CPU is configured to provide vertex data representing at least one graphics primitive to the at least one vertex shader and to call the at least one vertex shader in order to render the at least one graphics primitive, representing at least a part of the scene, into a frame buffer. The display is operably coupled to the frame buffer and displays the scene. The system architecture of the avionics display system simplifies the coding process for the developer and also speeds up image processing in comparison to conventional systems.

20 Claims, 9 Drawing Sheets

(56) References Cited

U.S. PATENT DOCUMENTS

| | | | |
|---|---|---|---|
| 8,982,124 B2* | 3/2015 | Li | G06T 15/60 345/426 |
| 2002/0196251 A1* | 12/2002 | Duluk, Jr. | G06T 1/60 345/420 |
| 2007/0257935 A1* | 11/2007 | Koduri | G06F 3/14 345/611 |
| 2008/0068389 A1* | 3/2008 | Bakalash | G06F 9/5044 345/505 |
| 2008/0074428 A1 | 3/2008 | Bakalash et al. | |
| 2008/0094403 A1* | 4/2008 | Bakalash | G06F 9/5066 345/505 |
| 2009/0073168 A1 | 3/2009 | Jiao et al. | |
| 2009/0189909 A1 | 7/2009 | Jiao et al. | |
| 2009/0213128 A1 | 8/2009 | Chen | |
| 2010/0214294 A1* | 8/2010 | Li | G06T 17/20 345/423 |
| 2012/0092353 A1 | 4/2012 | Paltashev et al. | |
| 2015/0070369 A1 | 3/2015 | Frascati et al. | |

FOREIGN PATENT DOCUMENTS

| | | |
|---|---|---|
| JP | 2007-13874 A | 1/2007 |
| JP | 2007-52775 A | 3/2007 |
| JP | 2007-55587 A | 3/2007 |
| JP | 2009-223906 A | 10/2009 |
| JP | 2013-14318 A | 1/2013 |
| JP | 2014-512032 A | 5/2014 |
| JP | 2016-536654 A | 11/2016 |
| TW | 200933522 A | 8/2009 |
| TW | 201216200 A | 4/2012 |
| WO | 2007/049610 A1 | 5/2007 |
| WO | 2015/037412 A1 | 3/2015 |

OTHER PUBLICATIONS

Unofficial English Translation of Taiwan Office Action issued in connection with corresponding TW Application No. 105107807 dated Oct. 27, 2016.

"Intel® Atom™ Processor E3827", Intel® Baytrail SoC, Retrieved from "https://web.archive.org/web/20150209221545/http://ark.intel.com/products/78478/Intel-Atom-Processor-E3827-1M-Cache-1_75-GHz", pp. 1-3, Nov. 17, 2016.

"Garmin G1000", Garmin International Inc, Retrieved from "https://en.wikipedia.org/wiki/Garmin_G1000, version dated Nov. 28, 2014, retrieved from https://en.wikipedia.org/w/index.php?title=Garmin_G1000&oldid=635713362", pp. 1-6, Nov. 17, 2016.

"GeForce GTX 750 Ti PCGaming Graphics Card from NVIDIA", Nvidia, pp. 1, Nov. 17, 2016.

Japanese Search Report issued in connection with corresponding JP Application No. 2016-059358 dated Apr. 11, 2017.

Notification of Reasons for Refusal issued in connection with corresponding JP Application No. 2016-059358 dated Apr. 25, 2017.

* cited by examiner

AVIONICS DISPLAY SYSTEM

FIELD

Embodiments of the present innovation relate generally to an avionics display system for use in various types of aircraft.

BACKGROUND

Over the last few decades the use of glass cockpits for aircraft, in which traditional analogue instrument displays have been replaced by on-screen electronic instrument displays, has become increasingly common even in light aircraft. Indeed, since the late 1980's certified electronic flight instrument systems (EFIS's) including such electronic instrument displays have become standard equipment on most Boeing® and Airbus® airliners.

Whilst recent advances in computing power, and reductions in the cost of display screens and navigational sensors (such as global positioning satellite (GPS) systems, attitude and heading reference systems etc.), have brought EFIS's to a wider market, they generally still use manufacturer-specific proprietary technology to provide the complex high-resolution graphics needed to provide the specific essential display components required for use in aircraft, such as the attitude director indicator (ADI), horizontal situation indicator (HSI), etc.

Consequently, as increased functionality, complexity and resolution is added to such EFIS displays, more processing power is demanded from the proprietary technology processors merely in order to generate the scene provided on the display to the pilots. This not only negates some of the benefits of using newer generation processors operating with higher clock rates, for example, but also increases coding complexity and coding length when programming the display output. This therefore increases the developer time needed and also increases the possibility of errors being introduced into the code when providing newer generation certified or uncertified EFIS's.

BRIEF DESCRIPTION

The present innovation thus seeks to provide an improved avionics display system that is both easier to configure and faster in operation than conventional EFIS displays. Various other benefits will also become apparent from the description that follows.

According to a first aspect of the present innovation, there is thus provided an avionics display system for displaying a scene in an aircraft cockpit. The scene may, for example, include a complex instrument display for an EFIS that is made up from thousands of graphics primitives. The avionics display system comprises a central processing unit (CPU), a graphics processing unit (GPU) and a display operably coupled to a frame buffer.

The GPU is operably coupled to the CPU and comprises at least one vertex shader. In operation, the CPU provides vertex data representing at least one graphics primitive to the vertex shader(s), and calls the vertex shader(s) in order to render the at least one graphics primitive representing at least a part of the scene into the frame buffer.

According to a second aspect of the present innovation, there is also provided a method for displaying a scene in an aircraft cockpit. The method comprises operating a CPU to provide vertex data representing at least one graphics primitive to at least one vertex shader, calling the at least one vertex shader in order to render the at least one graphics primitive representing at least a part of the scene into a frame buffer, and displaying the scene from the frame buffer on a display.

By replacing conventional CPU render code with a vertex shader, the amount of data that needs to be transferred between the CPU and a GPU to render the graphics primitive(s) is reduced. Moreover, the coding is also simplified and the rendering process also is considerably faster.

Additionally, the CPU requires less processing power and can thus be simplified. This, for example, allows conventional application specific processors to be replaced by low-power standard off-the-shelf processors, such as a RISC based processor or other processor type, that may, for example, usually be used in mobile telephone applications. Such processors also have reduced cooling requirements and thus do not need large heat sinks and bulky powered cooling equipment, thereby reducing the weight of the total electronics package that the aircraft needs to transport.

Various additional benefits will become apparent to those skilled in the art when considering the various embodiments of the present innovation that are described below.

BRIEF DESCRIPTION OF THE DRAWINGS

Various aspects and embodiments of the present innovation will now be described in connection with the accompanying drawings, in which.

DETAILED DESCRIPTION

Figure 1:
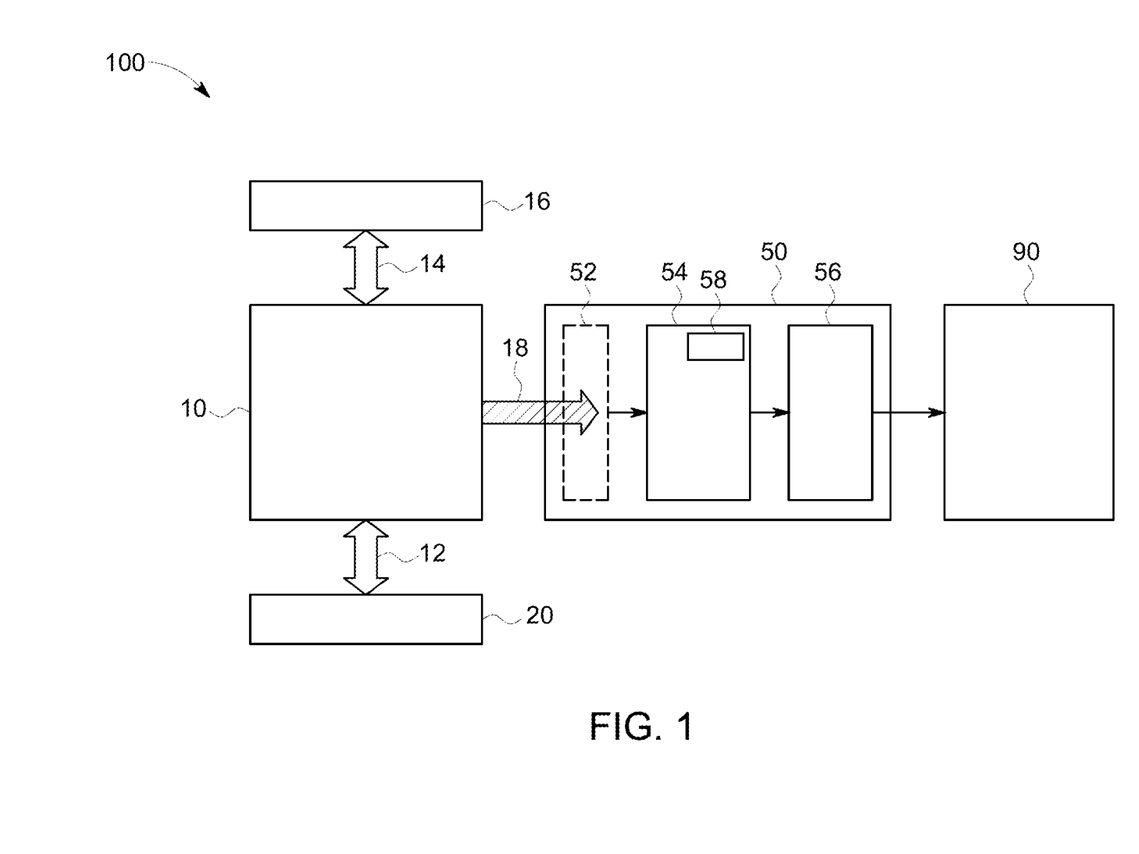
FIG. 1 shows an avionics display system in accordance with various aspects described herein.

FIG. 1 shows an avionics display system 100 in accordance with an embodiment of the present innovation. The avionics display system 100 uses an improved graphics processing technique for displaying a scene in an aircraft cockpit. Additionally, it enables the use of standard components, that can be already standards certified, cheaper, simpler and/or lighter, such that reliability is improved and so that certification by various aviation authorities (FAA, CAA etc.) of the whole system may be made more likely.

The avionics display system 100 includes a central processing unit (CPU) 10. CPU 10 is connected to avionics 20 through avionics bus 12. Data relating to flight instruments is transmitted to the CPU 10 through the avionics bus 12, is then processed by the CPU 10 and subsequently used for displaying flight data on a display 90. In certain embodiments, CPU 10 may be part of a redundant system, for example, including a plurality of similar CPU's that process substantially the same information that is compared and/or error checked to ensure system reliability and fault tolerance. Reduced weight for the processors and their associated cooling equipment is thus more important when many such processors are used to provide a redundant system.

CPU 10 is provided with system memory 16. The memory 16 may include volatile (e.g. RAM) and/or non-volatile (e.g. flash) memory. In various embodiments, the CPU 10 is an Intel® Baytrail SoC, version E3827 processor. This has a power consumption of 8 Watts and is light in weight. The low power consumption means less heat is produced, and thus that the CPU 10 is more reliable. Additionally, the E3827 processor [2] is light, inexpensive, easy to source, and has been well-tested in other fields of application.

CPU 10 is additionally coupled to a graphics card 50 via graphics bus 18. The graphics bus 18 may, for example, include a peripheral component interconnect (PCI) interface, a PCI Express (PCIe) interface or an accelerated graphics port (AGP). In one embodiment, the graphics card 50 is a GeForce GTX 750 Ti and the graphics bus 18 operates using PCI Express 3.0.

The graphics card 50 provides an application programming interface API 52 for interfacing the CPU 10 to a graphics processing unit (GPU) 54. The GPU 54 includes at least one processor core, as well as fast video memory 58. For example, 640 independent CUDA cores may be provided to facilitate single instruction multiple data (SIMD) parallel processing in the GPU 54. Such processor cores provide fast and powerful hardware-based floating point circuitry that is thus well-suited to complex mathematical data processing.

Each such processor core can be programmed via the API 52 to provide various stages of a rendering pipeline, such as a vertex shader. The vertex shader is a program that operates on a set of vertices, that define the boundaries of a graphics primitive, to mathematically transform the 3D virtual space positions thereof into the 2D coordinates at which they will appear in a frame buffer 56 and subsequently on the display 90. As well as position, the vertex shader(s) can also be programmed to manipulate colour and texture coordinates of vertices. The vertices and/or various attributes thereof are defined by vertex data representing the at least one graphics primitive.

The vertex shader(s) can be programmed, for example, in accordance with the OpenGL specification. Various known OpenGL compliant libraries may be used when coding the vertex shader(s). In various embodiments, the C-like OpenGL Shading Language (GLSL) is used to generate vertex data as a complied set of strings used to program the vertex shader(s) of the programmable GPU rendering pipeline in order to provide for customised image effects. A call to the vertex shader(s) executes rendering of the graphics primitive(s) defined by the vertex data, with the resultant output being written into the frame buffer 56.

The display 90 is operably coupled to the frame buffer 56 and is able to display the content of the frame buffer 56 as a full-screen scene that comprises multiple rendered graphics primitives that together depict, for example, an ADI, HSI, etc.

The customizable nature of the programmable GPU rendering pipeline is thus exploited by the present innovation to enable workload from the CPU 10 to be offloaded to the GPU 54. Additionally, faster overall processing is possible as various functionality (e.g. determining additional vertex data needed to define various graphics primitives) is delegated to the GPU 54, thus ensuring that the CPU 10 is not spending time sending instructions and data to the GPU 54 and then waiting for the GPU 54 to finish.

Moreover, coding is simplified for the developer as a reduced number of instructions and data points are needed to perform the graphics processing functions necessary to render the final scene.

By way of example, the inventor has found in testing that, even for a non-optimised embodiment, scene processing was speeded up by a factor of at least two. This was despite the number of code lines needed to implement the innovation being some 6 to 12, compared to the 200 to 500 that were needed beforehand when rendering the scene conventionally.

Figure 2:
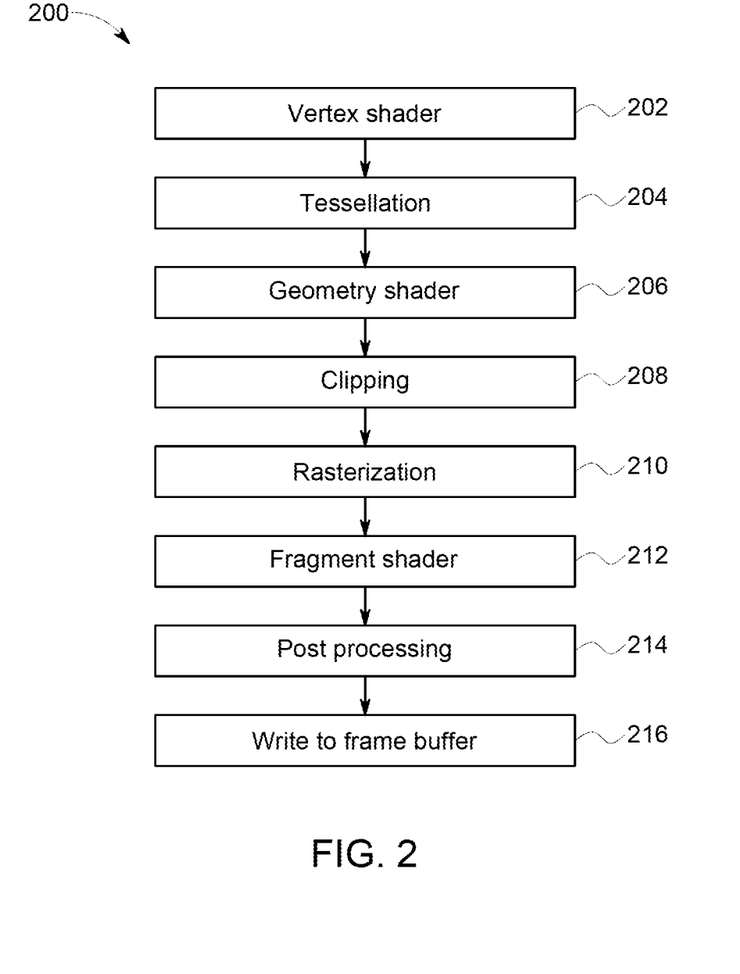
FIG. 2 shows the rendering pipeline used by the GPU of the avionics display system of FIG. 1 in accordance with various aspects described herein.

FIG. 2 shows a rendering pipeline 200 that may be used by the GPU 54 of the avionics display system 100 described above. The rendering pipeline 200 defines a sequence of operations that are taken by the GPU 54 in order to render an object such as a graphics primitive for display. The rendering pipeline is an example that may be implemented by one processor core of a GPU 54. Many such pipelines may be provided for respective parallel processor cores, when the vertex data is mutually independent, such that a SIMD operation can be performed. The graphics primitives are basic drawing shapes that can include, for example, triangles, lines, points, crowns, circles, etc.

CPU 10 may initially prepare a vertex array that includes the vertex data. This may, for fixed display components such as the outline of an HSI for example, include static data stored in a preconfigured array of vertices defining the necessary graphics primitives needed to depict the fixed display components in the final scene.

A vertex shader 202 then loads data defining respective vertices from the vertex data array. Conventional avionics display systems do not provide such a vertex shader in a GPU rendering pipeline for generating scenes therein. Attribute data defining the respective vertices includes at least a three-dimensional position ($x_{vn}$, $y_{vn}$, $z_{vn}$) in virtual space for each vertex, n, and provides an ordered list of vertices that are to be sent to the rendering pipeline 200. Interpretation of how the list of vertices is interpreted as a graphics primitive is handled at a later stage of the rendering pipeline 200.

In various embodiments, vertex arrays stored in system memory 16 are used to pass the vertex attribute data to the GPU 54 using API calls. However, it is also possible to use vertex buffer objects which are stored in video memory 58, this having the benefit that fewer API calls are needed from the CPU 10 in order to render the vertices. For example, the CPU 10 may define the vertex attributes locally in system memory 16, then create a buffer object before transferring the vertex attributes using glBufferData( ) or glBufferSubData( ) functions, or by mapping the buffer using glMapBuffer( ) or glMapBufferRange( ) functions.

The vertex shader 202 converts each input vertex into an output vertex based upon a user-defined program. This ordinarily comprises spatial 3D to 2D transforms for, e.g., rotating objects in the virtual space. However, in this application positional transformation is not generally necessary as the vertex shader 202 is mainly used for the add-on effects relating to the rendering functionality that are supported. By not requiring the use of positional transformation for the vertex data, processing is also further speeded up. This aspect of vertex processing using the vertex shader 202 is described in more detail below.

The output of the vertex shader 202 is then used for primitive assembly. Depending on the type of primitive the user rendered, it is then broken down into an ordered sequence of simple primitives (i.e. lines, points or triangles). In various embodiments using OpenGL, this functionality is provided by a geometry shader which may be provided by a default version or user defined.

Optionally, the sequence of simple primitives may then be tessellated using a tessellation stage 204. Tessellation stage 204 applies a tessellation control shader to the sequence of simple primitives before tessellating them using a fixed function tessellator stage. The output of the fixed function tessellator stage is further processed using a tessellation evaluation shader to provide the final output from the tessellation stage 204.

A further optional geometry shader 206 may also then be used to process either the output of the vertex shader 202 or the optional tessellation stage 204, if present. The geometry shader 206 provides a user-defined programmed stage that can process the graphics primitives defined, for example, by the input list of vertices. Output from the geometry shader 206 is zero or more simple primitives. Such a geometry shader 206 may, for example, operate in compliance with OpenGL 3.2 or later specifications.

The geometry shader 206 is operable to remove primitives from the input list or to tessellate them by creating multiple primitives for a single input. Vertices may also be manipulated and primitives may be converted from one type to another, e.g. lines to points, points to triangles, etc. The shaders, such as the geometry shader 206, are provided by programs that operate on input data to provide the appropriate output data.

In certain embodiments, the simple primitives created by the geometry shader 206 or as a result of primitive assembly can be written into a set of pre-defined buffer objects, in a transform feedback mode. Data thus created can be retained for later use, thereby speeding up the overall processing needed to render the scene. Such a transform feedback mode may additionally effectively be used as the final output of the rendering pipeline 200.

Alternatively, the output of the geometry shader 206 may optionally be used as input to a clipping stage 208. The clipping stage splits primitives that lie on a boundary between the outside and inside of a viewing volume into multiple primitives. Primitives that lie outside of the boundary are culled from the output data set.

The simple primitives are then subject to rasterization by rasterization stage 210. Rasterization converts the incoming sequence of primitives into respective two-dimensional images, known as a fragments. Each point of these fragments contains information such as colour and depth.

Rasterization of a primitive consists of two steps. The first determines which squares of an integer grid in window/display coordinates are occupied by the primitive. The second assigns a colour and a depth value to each such square.

The fragments produced by the rasterization stage 210 are provided as input to a fragment shader 212, sometimes referred to as a pixel shader. The fragment shader 212 processes each fragment into a set of three colours and a depth value, and optionally also adds stencil value data. The depth value (z-value) defines the depth position of the fragment in 3D space and the colour values provide the conventional RGB colour data necessary to display the fragment on the display 90.

A post-processing stage 214 then acts upon the output data of the fragment shader 212 to determine which is to be written to the framebuffer 56 for display on the display 90. The post-processing stage 214 initially applies various culling tests as necessary. If so configured, a stencil test can be applied to the fragments and those failing the test are culled. A depth test may also be applied, with any fragments failing the test similarly being culled and not added into the framebuffer 56.

Framebuffer blending is then applied between the fragments being written into the framebuffer 56 and any colour values already in the framebuffer 56 at the same location as the fragments being written thereto.

At stage 216 the fragment data is then written to the framebuffer 56 for display on the display 90. Optionally, the user can also apply various masking operations such as depth, colour, stencil, etc. to create various effects in the final rendered scene.

Figure 3:
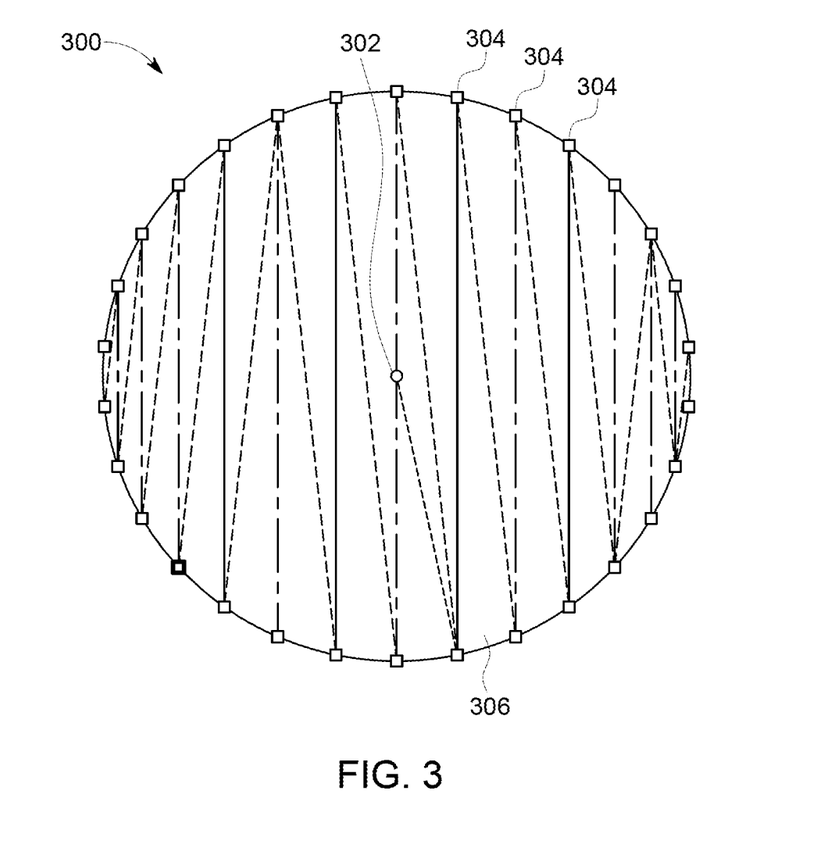
FIG. 3 shows a graphics primitive defined using conventional CPU rendering code.

FIG. 3 shows a graphics primitive 300 defined using conventional CPU rendering code. The graphics primitive 300 is a circle defined by a central vertex 302 radially surrounded by thirty further circumferentially positioned vertices 304. A vertex array defining the graphics primitive 300 includes vertex data corresponding to the vertices 302, 304 placed in sequence so as to define a mesh of sequential triangles 306 that approximate a circle centred on the vertex 302.

Various other graphics primitives can also be defined using a triangular mesh. For example, such other graphics primitives may comprise an ellipse, crown, arc, rectangle, rectangle with rounded corners, single line, multiple lines, text, etc.

The CPU generates all the vertex, triangle and colour lists. These are then sent for rendering. To improve the EFIS display anti-aliased lines are required to outline the graphics. These lines increase the number of vertex points that are needed. Additionally, a circle graphic, for example, needs to be approximated to help reduce the number of triangles required to define the circle perimeter. Hence predefined vertices are used for to avoid the need to perform trigonometric calculations.

Conventional systems thus require graphics porting layers which provide functions to draw complex primitives that need to calculate vertices each time they are called. When performing a gradient fill, each vertex requires its colour to be defined or textures to be used. In either case, this requires extra vertex information to be calculated and sent. Such complexity means that even to code a relatively simple complex primitive using conventional techniques, requires more than one hundred lines of code.

Figure 4:
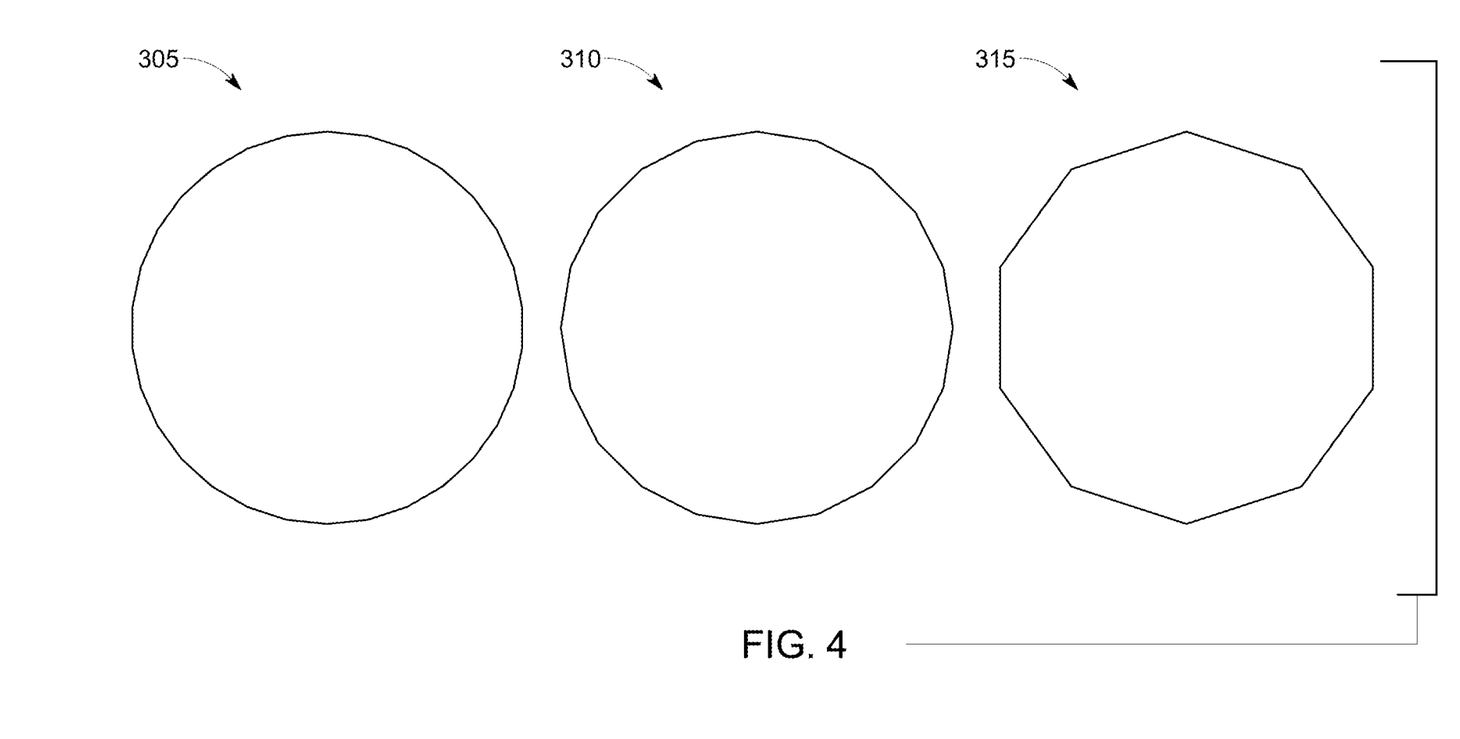
FIG. 4 shows varying accuracy rendered graphics primitives produced using the conventional CPU rendering code.

FIG. 4 shows three varying accuracy rendered graphics primitives 305, 310, 315, depicting circles, that can be produced using the conventional rendering code shown in FIG. 3. These graphics primitives 305, 310, 315 depict a circle after rendering using differing numbers of vertices as input for the vertex array.

In each respective triangular mesh, the graphics primitives 305, 310, 315 are effectively rendered as circles having a circle circumference approximated using a number of straight lines. Hence to increase the accuracy of the render, the number of lines, as defined by the number of vertices and thus the number of triangular primitives, needs to be increased.

However, if too many lines are used per primitive this will impact the render speed. In contrast, if too few lines are used, the user will be able to perceive the graphics primitive as an N-sided polygon (the so-called 50p effect, which can be seen in FIG. 4 as the graphics primitives move from using thirty circumferential vertices in graphics primitive 305, to twenty in graphics primitive 310 and to ten in graphics primitive 315). Consequently, there is a trade-off between approximation and render speed when using prior art techniques.

Figure 5:
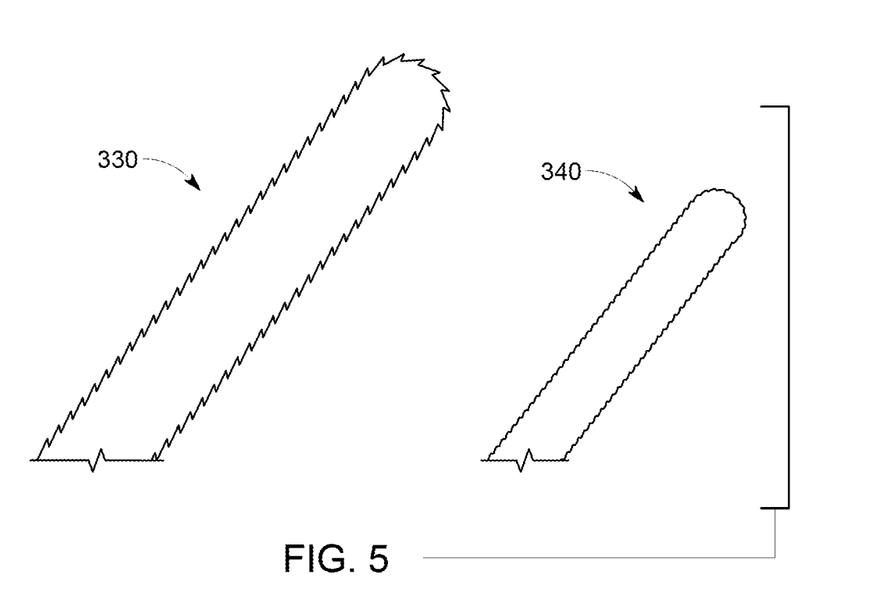
FIG. 5 shows an aliased and anti-aliased graphic that can be produced by various aspects described herein.

FIG. 5 shows an aliased graphic 330 and anti-aliased graphic 340 that can be produced by various embodiments of the present innovation. Both graphics 330, 340 are produced from the same input vertices provided in a vertex array to the rendering pipeline 200.

Anti-aliasing is applied in the rendering pipeline by the fragment shader. It is calculated on a pixel-per-pixel basis as follows: i) if the pixel is fully inside the graphics primitive then full colour is applied to the respective pixel; ii) if the pixel is fully outside the graphics primitive then it is discarded; and iii) if the pixel is partially contained within the graphics primitive then depending on the percentage to which it lies within the graphics primitive the anti-aliasing effect is then applied.

In graphic 330, aliased artifacts (jagged edges) are seen when the graphics primitive defined by the vertex array is displayed on the display 90 post-rendering. By applying an anti-aliased render, the jagged edges can be eliminated by using rendering techniques which assign pixel colours based upon a fraction of a pixel's area that is covered by the graphics primitive. Such a technique provides the softer edges seen in the graphic 340.

Ordinarily, conventional anti-aliasing techniques would have a massive impact on render speed as they normally require the graphics primitive to be drawn multiple times (e.g. by repeatedly using the CPU rendering code of FIG. 3). This may thus be problematic when using conventional CPU-driven rendering, but not for the present innovation in which the fragment shader of the rendering pipeline 200 can be used.

Figure 6:
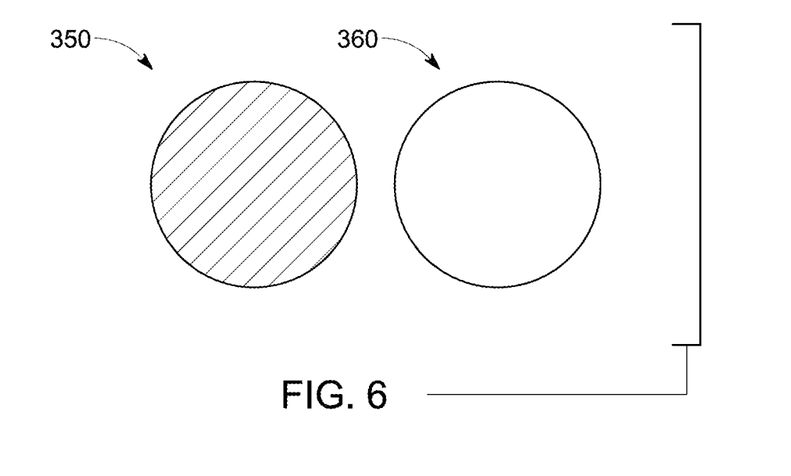
FIG. 6 shows graphics primitives that can be produced by various aspects described herein.

FIG. 6 shows graphics primitives that can be produced by various embodiments of the present innovation. The circular graphics primitive 350 can be defined either by a set of vertices that define a triangular mesh in the vertex array or as a sequence of vertices that define the perimeter of a circle.

In either case, graphics primitive 350 is shown having been rendered by the rendering pipeline 200 as a solid filled circle. By contrast, the rendering pipeline 200 was programmed to render graphics primitive 360 with an outline only using the same input vertex array data as per graphics primitive 350.

Figure 7:
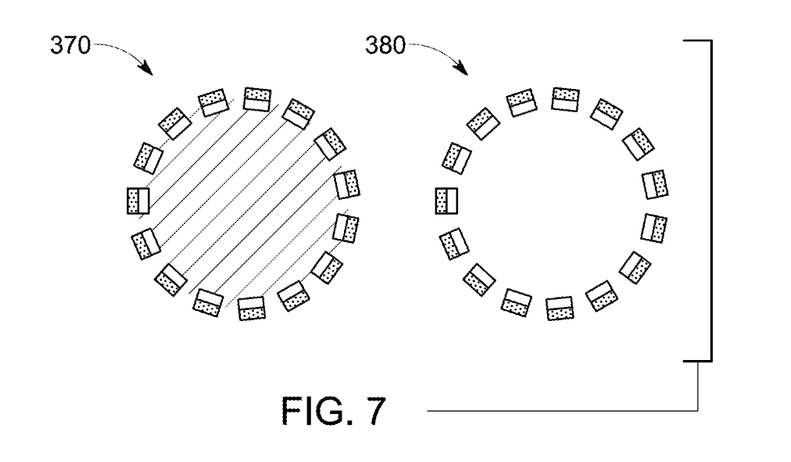
FIG. 7 shows complex graphics primitives that can be used with various aspects described herein.

FIG. 7 shows complex graphics primitives 370, 380 that can be used with various embodiments of the present innovation. The complex graphics primitives 370, 380 use the same basic vertex array data as per graphics primitives 350 and 360.

However, the graphics primitives 370, 380 are complex graphics primitives because a number of basic primitives are controlled as a single graphic primitive using various additional attribute parameters. Such attribute parameters may define, for example, outline width, outline stipple pattern, outline colour, fill colour, fill gradient, halo colour, halo width, etc.

In the examples shown, complex graphics primitive 370 uses outline width, outline stipple pattern, outline colour, fill colour, halo colour and halo width attribute parameters. Complex graphics primitive 380 uses outline width, outline stipple pattern, outline colour, halo colour and halo width attribute parameters.

Figure 8:
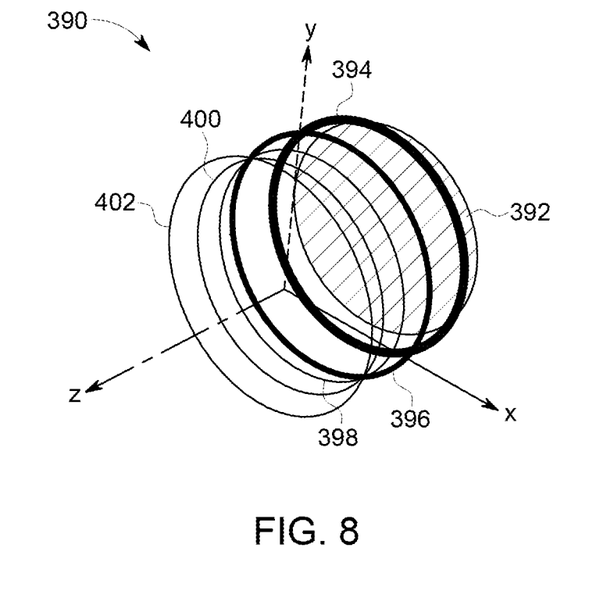
FIG. 8 shows an exposed view of a complex graphics primitive that can produced by various aspects described herein.

FIG. 8 shows an exposed view of a complex graphics primitive 390 that can produced by various embodiments of the present innovation. The complex graphics primitive 390 is a complex circle that is filled, outlined, haloed and provided with anti-aliasing. Complex graphics primitive 390 is produced by rendering a vertex array data using the rendering pipeline 200 and includes a fill 392, outline 394, halo 396 and three anti-aliased lines 398, 400, 402. Such a rendered complex graphics primitive 390 may, for example, be used as part of an HSI as depicted as part of a scene in an avionics EFIS display.

By using the technique of the present innovation, in which triangle generation logic is moved from the CPU 10 and into vertex shader 202, CPU 10 only needs to send a few points to define the outline of the same graphics primitive. Anti-aliasing is also calculated by the GPU 54 on a per-pixel inside the vertex shader 202. A circle perimeter is also defined per pixel, and is therefore infinitely smooth. Accurate embedded sine and cosine functions are provided by lookup tables in the GPU 54, and are thus very fast. No caching of vertex data is thus required, and gradient fills are efficiently performed by the GPU 54. Moreover, coding is simplified and requires fewer lines to code the same complex graphics primitive (fewer than one hundred in the present instance).

Figure 9:
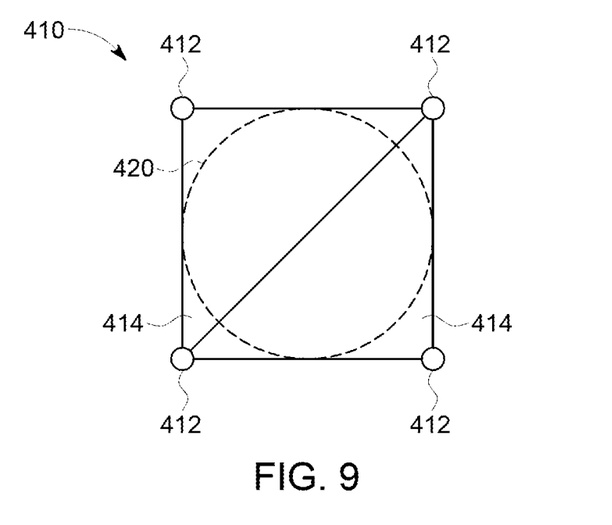
FIG. 9 shows another graphics primitive that can be used with various aspects described herein.

FIG. 9 shows another graphics primitive 410 that can be used with various embodiments of the present innovation, for example, to provide part of a scene for an EFIS display by using rendering pipeline 200. The graphics primitive 410 is provided by an ellipse program that was used to program the vertex shader 202. The vertex shader 202 thus programmed can also be used to render circles, crowns and arcs.

CPU 10 defines two triangles 414 by generating a set of four vertices 412. These triangles are provided as sequential vertices in the vertex array passed to the rendering pipeline 200.

CPU 10 then calls the vertex shader 202 with the following data: centre of the circle, ellipse major axis (A), ellipse minor axis (B), crown width, start angle, end angle, outline colour, outline width, halo colour, halo width, and fill colour.

The vertex shader 202 may be operated to define an outer rectangle based on the vertices 412. Rather than filling/rendering multiple individual triangles as is conventional (see FIG. 3, for example), the vertex shader 202 can be operated to colour both the inside and outside of the graphics primitive 410 defined within the boundary of the outer rectangle. For example, the area outside of the ellipse but within the outer rectangle may be discarded (i.e. not changed in order to render them transparent) where the graphics primitive is to be placed in a scene. This enables the full functionality of the vertex shader 202 to be used to provide 2D image rendering within the outer rectangle whilst both minimising the number of commands and the size of the vertex array that are needed.

Figure 10:
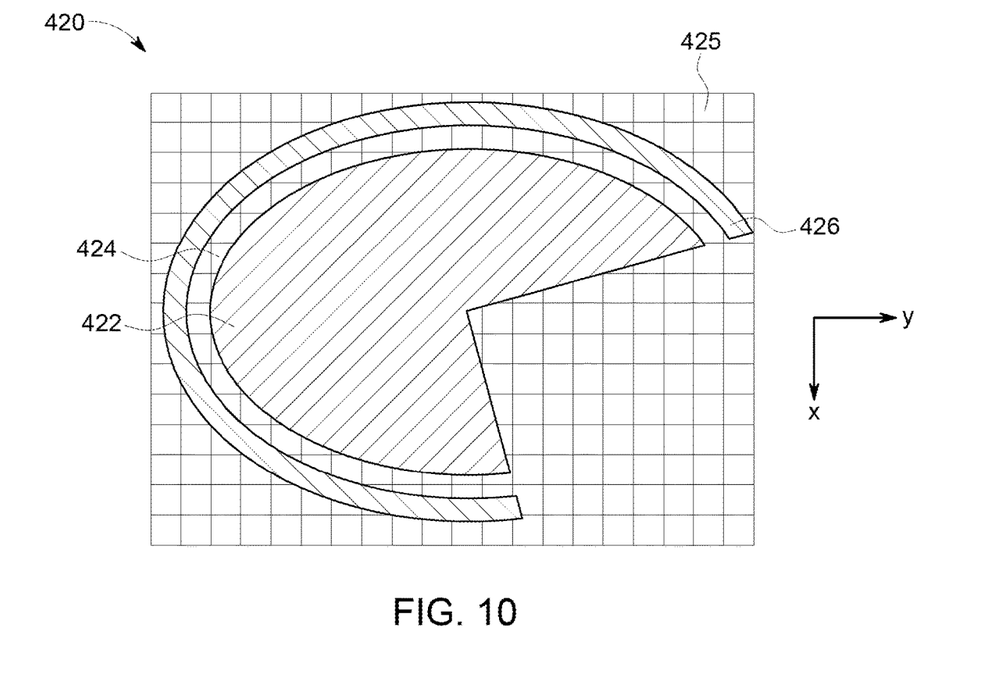
FIG. 10 shows processing of the graphics primitive of FIG. 9 by a fragment shader of a rendering pipeline in accordance with various aspects described herein.

FIG. 10 shows processing of the graphics primitive of FIG. 9 by the fragment shader 212 of rendering pipeline 200. The fragment shader 212 determines for each pixel, $p_{x,y}$, in a grid of pixels 420 where in the ellipse in the pixels falls. The relative positions of the grid 420 and the ellipse determine the colour of the pixel $p_{x,y}$, which is set in dependence upon its position, if it falls within the ellipse, or made transparent 425 if it falls outside of it. The grid 420 is shown overlaying the fill 422, the outline 424 and the halo 426.

Hence a reduced number of points (e.g. a minimum number for defining a rectangle) are sent by the CPU 10 to effectively define a canvas. The fragment shader 212 then draws the required shape onto the canvas without the CPU 10 needing to send all the vertices.

Figure 11:
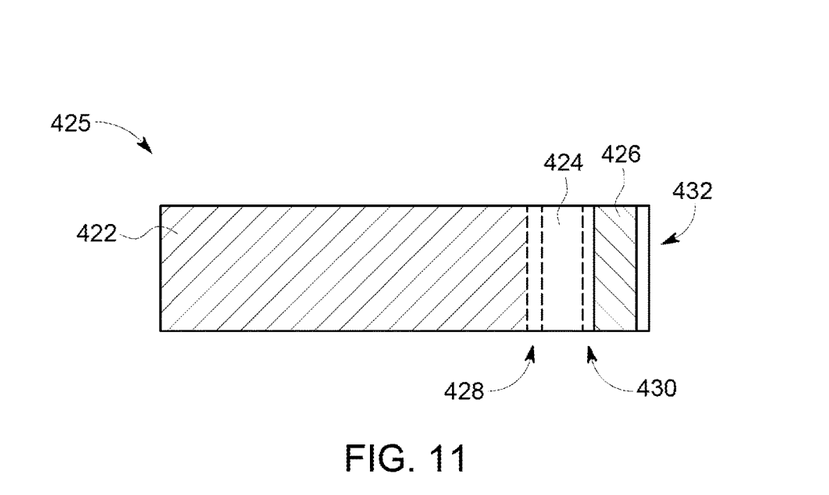
FIG. 11 shows how anti-aliasing is applied by the fragment shader to the graphics primitive of FIG. 9 in accordance with various aspects described herein.

FIG. 11 shows how anti-aliasing is applied by the fragment shader 212 to the graphics primitive of FIG. 9. The fragment shader 212 performs anti-aliasing between the colour boundaries 428, 430 and 432 found respectively between each of the fill 422, the outline 424, the halo 426 and the background 425. In this instance this was implemented by using a simple linear ramp between each of the two respective colours.

Figure 12:
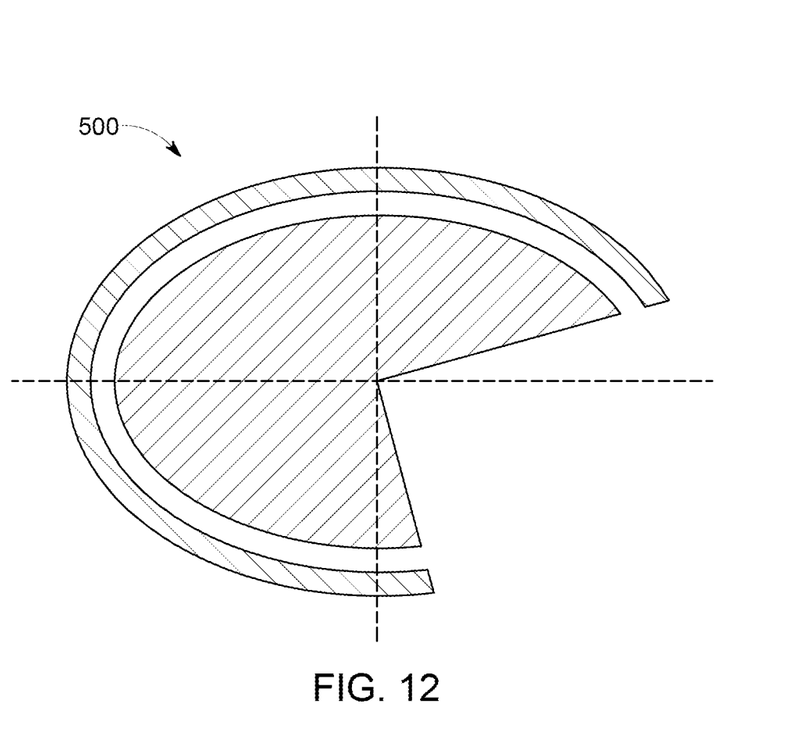
FIG. 12 shows the rendered graphics primitive of FIG. 9 as written to a scene on a display.

FIG. 12 shows the final rendered graphics primitive 500 as written to the framebuffer 56 for showing in a scene on the display 90. FIG. 12 is further annotated to show the major axis (A), the minor axis (B) and the start and end angles that were used as attribute parameters in the rendering pipeline 200.

Figure 13:
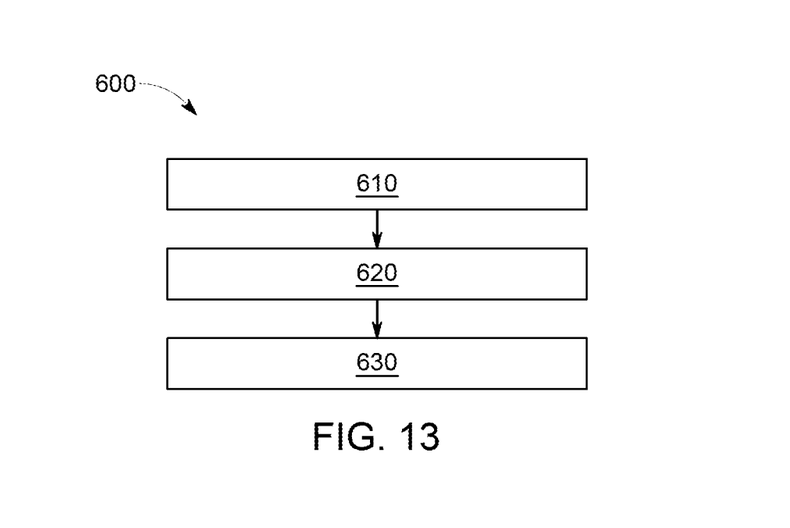
FIG. 13 shows a method that can be implemented in accordance with various aspects described herein.

FIG. 13 shows a method 600 that can be implemented in accordance with various embodiments of the present innovation. The method 600 is for displaying a scene in an aircraft cockpit using an avionics display system, and comprises operating 610 a CPU to provide vertex data representing at least one graphics primitive to at least one vertex shader, calling 620 the at least one vertex shader in order to render the at least one graphics primitive representing at least a part of the scene into a frame buffer, and displaying 630 the scene from the frame buffer on a display. The vertex data may be provided as a vertex buffer object and stored in video memory. In various embodiments, the vertex data may be mapped from a three-dimensional to a two-dimensional data set.

In various embodiments, the method 600 can be used to determine whether a pixel in a scene falls inside or outside of any particular graphics primitive. Pixel-based rather than vertex-based definition may thus be used for the various graphics primitives. The benefit of this is that smoother graphics primitives can be produced by substantially eliminating the approximation present when using conventional rendering, and that pixels lying on the boundaries of the graphics primitives can be coloured appropriately to reduce stark edge effects in the final rendered scene.

An application specific interface (API) may be provided for interfacing the CPU with a GPU. The API may, for example, operate in accordance with the OpenGL specification.

The method 600 may further comprise performing an anti-aliasing operation on pixel data stored and/or rendering a plurality of graphics primitives representing at least a part of a scene in parallel using multiple parallel vertex shader pipelines.

The method 600 enables CPU workload to be reduced to calling the vertex shader in a GPU. Accelerated hardware in the GPU provides for faster trigonometric function, vector maths and matrix calculations. Anti-aliasing is also carried out with very little overhead compared to the CPU equivalent techniques, as well as providing for pixel accuracy rather than the CPU vertex accuracy rendering. Additionally, the present innovation enables a complete graphics primitive, and even a complex graphics primitive, to be rendered in a single pass. Two-dimensional (2D) rendering of a whole image area around a graphics primitive may also be performed. For example, rectangles having rounded corners can be more easily produced using this technique.

Various benefits of embodiments of the present innovation also include the ability to reduce the cost, weight and power consumption of avionic display systems by using low-cost, low-power mobile telephone parts known as System-On-a-Chip (SoC) by reducing the computing power required.

Various embodiments of the present innovation have been described herein. Those skilled in the art will be well-aware that such embodiments may be implemented as desired by using, for example, one or more software, hardware and/or firmware-based elements.

For example, those skilled in the art will realise that the position, hue, saturation, brightness and contrast of all pixels, vertices or textures used to construct a final scene may be altered on-the-fly using algorithms defined in the various shaders, and may be modified by external variables introduced by the CPU when calling the shaders. Such shaders may be executed on specific hardware/firmware (e.g. vertex/pixel/geometry) or by using generic processing units capable of executing any type of shader (e.g. the CUDA cores of a GeForce GTX 750 Ti).

What is claimed is:

1. An avionics display system for displaying a cockpit scene, the avionics display system comprising:
a central processing unit (CPU);
a graphics processing unit (GPU) operably coupled to the CPU, the GPU comprising at least one vertex shader, and a video memory storing one or more vertex buffer objects, wherein the CPU is configured to provide vertex data representing at least one graphics primitive to the at least one vertex shader and to call the at least one vertex shader in order to render the at least one graphics primitive representing at least a part of a scene into a frame buffer;
a display operably coupled to the frame buffer for displaying said scene, the display comprising at least one identified square of an integer grid;
a fixed function tesslation shader stage for applying a tessellation control shader to the at least one graphics primitive;
a user-defined programmed stage for applying a geometry shader to the output of the tessellation control shader;
a clipping stage for splitting portions of the geometry shader output that lie on a boundary of a viewing volume;
a rasteriziation stage for rastering the output of the clipping stage,
wherein the at least one identified square is occupied by the at least one graphics primitive and is assigned a color and depth value.

2. The avionics display system of claim 1, wherein the GPU and the frame buffer are provided by a graphics card, wherein the graphics card is also operable to provide an application programming interface (API) for interfacing the CPU with the GPU, and wherein the avionics display is connected to an aircraft avionics system via an avionics bus.

3. The avionics display system of claim 2, wherein the CPU generates the vertex data as a vertex buffer object or as a list of points which is stored in the video memory.

4. The avionics display system of claim 2, wherein the API operates in accordance with the OpenGL specification.

5. The avionics display system of claim 1, wherein the vertex data is mapped to a two-dimensional data set; and wherein said avionics display is mounted in an aircraft cockpit and display data from aircraft instrumentation.

6. The avionics display system of claim 5, wherein the GPU is operable to perform an anti-aliasing operation on pixel data stored in the frame buffer.

7. The avionics display system of claim 1, wherein the GPU incorporates a vertex shader pipeline having a geometry shader.

8. The avionics display system of claim 1, wherein the GPU incorporates multiple parallel vertex shader pipelines.

9. A method for displaying a cockpit scene using an avionics display system, the method comprising:
  operating a CPU to provide vertex data representing at least one graphics primitive to at least one vertex shader;
  providing a GPU for housing said vertex shader, said GPU further comprising video memory storing one or more vertex buffer objects;
  calling the at least one vertex shader in order to render the at least one graphics primitive representing at least a part of the scene into a frame buffer;
  applying a fragment shader to said at least one graphics primitive into a set of three colours and a depth value, said depth value defining the depth position of one or more fragments in a 3D space;
  applying a post-processing stage to the output of the fragment shader, said post processing stage comprising;
    applying a stencil test to said one or more fragments;
    applying a depth test to said one or more fragments, wherein fragments of said one or more fragments failing said stencil test or said depth test are culled;
    adding the remaining un-culled one or more fragments to a frame buffer;
    blending said remaining un-culled one or more fragments in said frame buffer; and
    writing said blended one or more fragments to said frame buffer for displaying on said display; and
  displaying the scene from the frame buffer on a display.

10. The method of claim 9, further comprising providing an application programming interface (API) for interfacing the CPU with a GPU; and
  operating the API in accordance with the OpenGL specification.

11. The method of claim 9 further comprising generating the vertex data as a vertex buffer object and storing the vertex buffer object in video memory.

12. The method of claim 9, further comprising mapping the vertex data from a three-dimensional to a two-dimensional data set.

13. The method of claim 9, further comprising performing an anti-aliasing operation on pixel data stored in the frame buffer;
  mounting said avionics display in an aircraft cockpit; and
  displaying data from aircraft instrumentation.

14. The method of claim 13, further comprising rendering a plurality of graphics primitives representing at least a part of the scene in parallel using multiple parallel vertex shader pipelines.

15. The method of claim 14, further comprising checking if each pixel in the scene comprises the at least one graphics primitive so as to avoid approximating the at least one graphics primitive in the scene.

16. The method of claim 15, further comprising applying a tessellation control shader to the at least one graphics primitive using a fixed function tessellator stage; and
  applying a geometry shader to the output of the tessellation control shader for providing a user-defined programmed stage;
  wherein said user-defined programmed stage can process the at least one graphics primitive using an input list of vertices.

17. The method of claim 16, further comprising applying a clipping stage to the output of the geometry shader for splitting portions of the at least one graphics primitive that lie on a boundary of a viewing volume; and
  applying a rasterization stage to the output of the clipping stage, said rasterization stage comprising:
    identifying squares of an integer grid in display coordinates that are occupied by said at least one graphics primitive; and
    assigning a colour and depth value to each of said squares.

18. A method for displaying a cockpit scene using an avionics display system, the method comprising:
  operating a CPU to provide vertex data representing at least one graphics primitive to at least one vertex shader;
  providing a GPU for housing said vertex shader, said GPU further comprising video memory storing one or more vertex buffer objects;
  calling the at least one vertex shader in order to render the at least one graphics primitive representing at least a part of the scene into a frame buffer;
  applying a clipping stage for splitting portions of the at least one graphics primitive that lie on a boundary of a viewing volume;
  applying a rasterization stage to the output of the clipping stage, said rasterization stage comprising:
    identifying squares of an integer grid in display coordinates that are occupied by said at least one graphics primitive; and
    assigning a colour and depth value to each of said squares; and
  displaying the scene from the frame buffer on a display.

19. The method of claim 18, further comprising applying a fragment shader to the output of the rasterization stage for fragmenting said at least one graphics primitive into a set of three colours and a depth value, said depth value defining the depth position of one or more fragments in a 3D space; and
  applying a post-processing stage to the output of the fragment shader, said post processing stage comprising;
    applying a stencil test to said one or more fragments;
    applying a depth test to said one or more fragments, wherein fragments of said one or more fragments failing said stencil test or said depth test are culled;
    adding the remaining un-culled one or more fragments to a framebuffer;
    blending said remaining un-culled one or more fragments in said framebuffer; and
    writing said blended one or more fragments to said framebuffer for displaying on said display.

20. The method of claim 19, further comprising checking if each pixel in the scene comprises the at least one graphics primitive so as to avoid approximating the at least one graphics primitive in the scene.

* * * * *